(12) United States Patent
Yamashita et al.

(10) Patent No.: US 11,794,387 B2
(45) Date of Patent: Oct. 24, 2023

(54) INJECTION MOLDING APPARATUS

(71) Applicant: SEIKO EPSON CORPORATION, Tokyo (JP)

(72) Inventors: Seiichiro Yamashita, Yokohama (JP); Mitsutoshi Kato, Ota (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/876,672

(22) Filed: Jul. 29, 2022

(65) Prior Publication Data
US 2023/0036026 A1  Feb. 2, 2023

(30) Foreign Application Priority Data
Jul. 30, 2021  (JP) .................. 2021-125254

(51) Int. Cl.
| | |
|---|---|
| B29C 45/18 | (2006.01) |
| B29C 45/04 | (2006.01) |
| B29C 45/22 | (2006.01) |
| B29C 45/26 | (2006.01) |
| B29C 45/47 | (2006.01) |
| B29C 45/73 | (2006.01) |
| B29C 45/17 | (2006.01) |

(52) U.S. Cl.
CPC ...... *B29C 45/0441* (2013.01); *B29C 45/1756* (2013.01); *B29C 45/2602* (2013.01); *B29C 45/2681* (2013.01); *B29C 45/47* (2013.01); *B29C 45/7312* (2013.01)

(58) Field of Classification Search
CPC . B29C 45/0441; B29C 45/46; B29C 45/1756; B29C 45/2602; B29C 45/2681; B29C 45/464; B29C 45/47; B29C 45/7312
See application file for complete search history.

(56) References Cited

U.S. PATENT DOCUMENTS

2020/0055219 A1   2/2020   Watanabe et al.

FOREIGN PATENT DOCUMENTS

| JP | H02-23390 Y2 | 6/1990 |
|---|---|---|
| JP | 2020-028975 A | 2/2020 |

*Primary Examiner* — Thu-Khanh T. Nguyen
(74) *Attorney, Agent, or Firm* — Harness, Dickey & Pierce, P.L.C.

(57) ABSTRACT

An injection molding apparatus includes: a first fixed mold attachment and detachment unit configured to attach and detach a first fixed mold; a second fixed mold attachment and detachment unit configured to attach and detach a second fixed mold; a first movable mold attachment and detachment unit configured to attach and detach a first movable mold; a first injection unit configured to inject a first molding material through a first gate opening of the first fixed mold; a second injection unit configured to inject a second molding material through a second gate opening of the second fixed mold; and a position changing unit configured to change a position of the first movable mold attachment and detachment unit such that the first movable mold is located at a position facing the first fixed mold or the second fixed mold. The position changing unit includes: a driving unit, a rotation shaft member configured to rotate by the driving unit, and a rotation disk coupled to the rotation shaft member and provided with the first movable mold attachment and detachment unit. The rotation disk is configured to rotate about a rotation axis of the rotation shaft member, and a flow path that communicates with the first movable mold and through which a medium flows is formed in the rotation shaft member.

8 Claims, 13 Drawing Sheets

INJECTION MOLDING APPARATUS

The present application is based on, and claims priority from JP Application Serial Number 2021-125254, filed Jul. 30, 2021, the disclosure of which is hereby incorporated by reference herein in its entirety.

BACKGROUND

1. Technical Field

The present disclosure relates to an injection molding apparatus.

2. Related Art

An injection molding apparatus is known in which a material plasticized by a plasticizing device is supplied to a cavity formed by a pair of molds and is injected from a nozzle.

For example, JP-UM-B-2-23390 describes a rotary type injection molding machine including three injection devices, three fixed molds, and three movable molds. In the rotary type injection molding machine described in JP-UM-B-2-23390, each movable mold is rotatably attached to a rotary type attachment disk and is clamped with a corresponding fixed mold, so that a three-color molded product is molded by injecting molding materials from the injection devices.

In the injection molding machine as described above, it may be necessary to cool the movable mold in order to cool a cavity after injection. However, in the injection molding machine that molds a multi-color molded product as described in JP-UM-B-2-23390, since the movable mold rotates, when cooling is performed by, for example, passing water to the movable mold, arrangement of a hose becomes complicated and the machine becomes complicated.

SUMMARY

An aspect of the present disclosure relates to an injection molding apparatus. The injection molding apparatus includes: a first fixed mold attachment and detachment unit configured to attach and detach a first fixed mold; a second fixed mold attachment and detachment unit configured to attach and detach a second fixed mold; a first movable mold attachment and detachment unit configured to attach and detach a first movable mold that is configured to be clamped with the first fixed mold or the second fixed mold; a first injection unit configured to inject a first molding material through a first gate opening of the first fixed mold; a second injection unit configured to inject a second molding material through a second gate opening of the second fixed mold; and a position changing unit configured to change a position of the first movable mold attachment and detachment unit such that the first movable mold is located at a position facing the first fixed mold or the second fixed mold. The position changing unit includes: a driving unit, a rotation shaft member configured to rotate by the driving unit, and a rotation disk coupled to the rotation shaft member and provided with the first movable mold attachment and detachment unit. The rotation disk is configured to rotate about a rotation axis of the rotation shaft member, and a flow path that communicates with the first movable mold and through which a medium flows is formed in the rotation shaft member.

DESCRIPTION OF EXEMPLARY EMBODIMENTS

Hereinafter, preferred embodiments of the present disclosure will be described in detail with reference to drawings. The embodiments described below do not unduly limit contents of the present disclosure described in the claims. In addition, not all configurations described below are necessarily essential constituent elements of the present disclosure.

1. Injection Molding Apparatus
1.1. Overall Configuration

Figure 1:
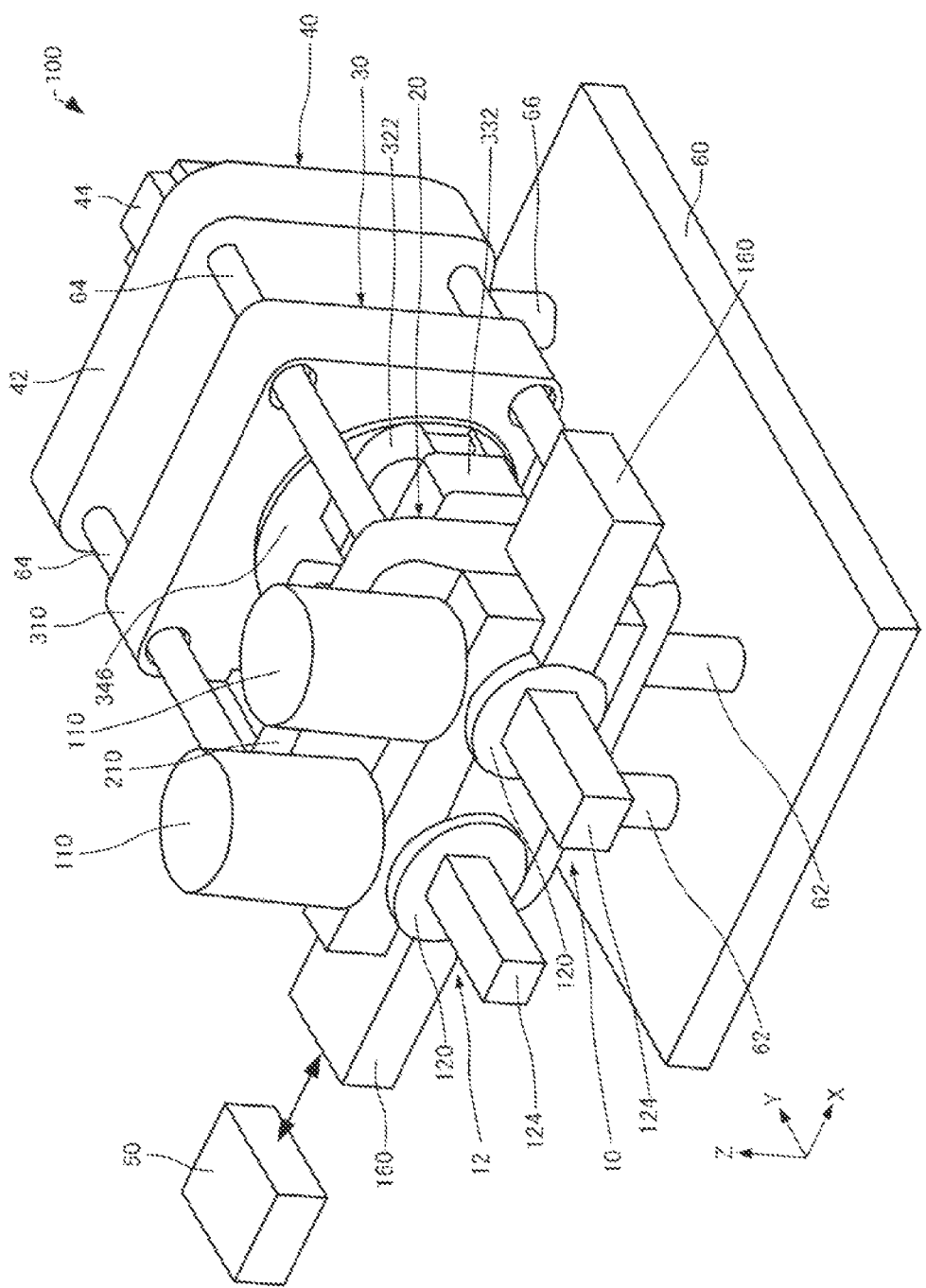
FIG. 1 is a perspective view schematically showing an injection molding apparatus according to the present embodiment.
Figure 2:
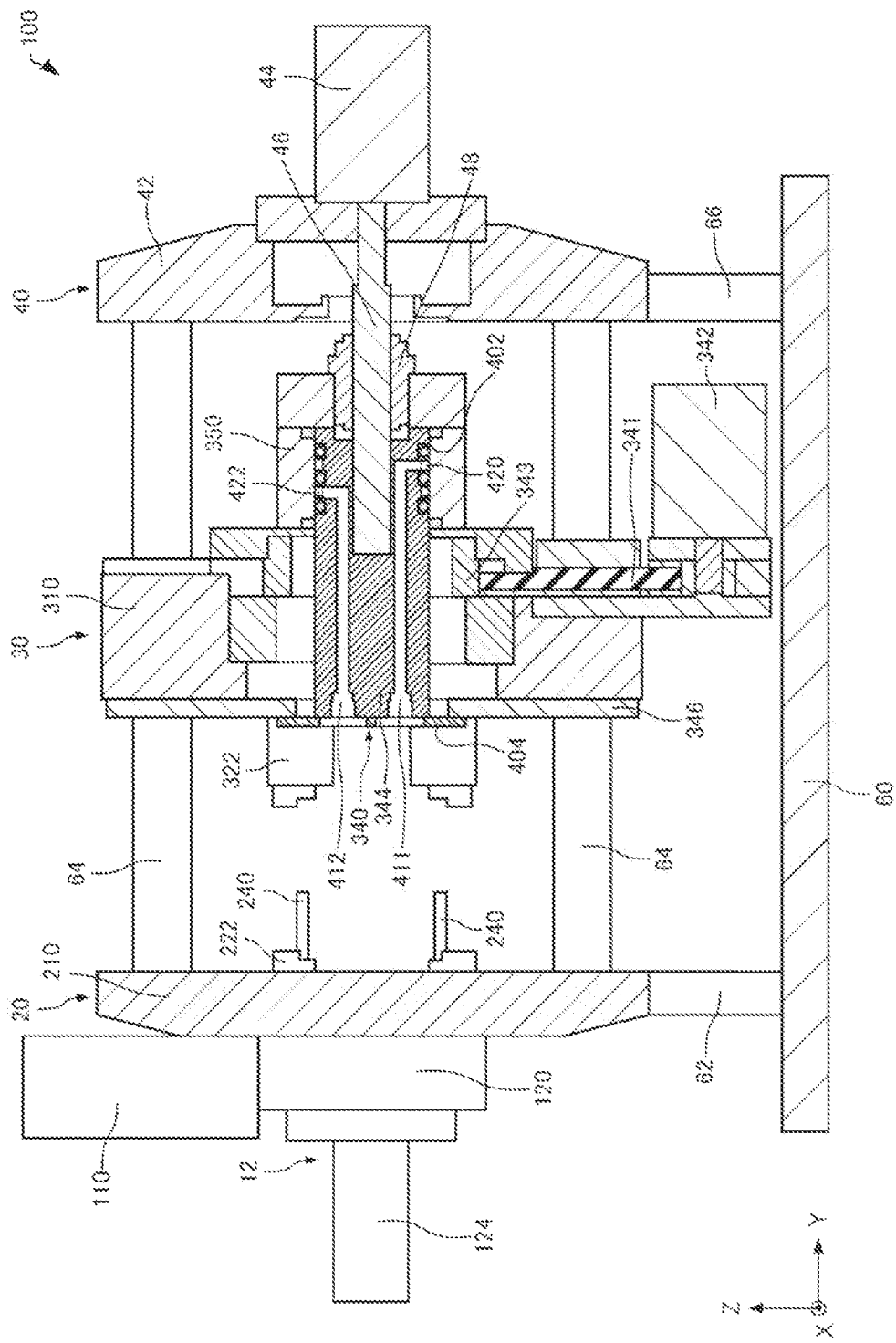
FIG. 2 is a cross-sectional view schematically showing the injection molding apparatus according to the present embodiment.

First, an injection molding apparatus according to the present embodiment will be described with reference to the drawings. FIG. 1 is a perspective view schematically showing an injection molding apparatus 100 according to the present embodiment. FIG. 2 is a cross-sectional view schematically showing the injection molding apparatus 100 according to the present embodiment. FIGS. 1 and 2 each show an X-axis, a Y-axis, and a Z-axis as three axes orthogonal to each other. An X-axis direction and a Y-axis direction are, for example, horizontal directions. A Z-axis direction is, for example, a vertical direction.

As shown in FIGS. 1 and 2, the injection molding apparatus 100 includes, for example, a first injection unit 10, a second injection unit 12, a fixed mold unit 20, a movable mold unit 30, a mold clamping unit 40, and a control unit 50. For convenience, FIG. 2 illustrates the first injection unit 10 in a simplified manner.

The injection molding apparatus 100 sequentially injects a plurality of molding materials to perform multi-color molding, thereby molding a molded product. In an illustrated example, the injection molding apparatus 100 includes two injection units 10 and 12, and performs multi-color molding using two molding materials different from each other. The multi-color molding is not limited to injection molding using molding materials that have different colors, and also includes injection molding using different types of molding materials.

Specifically, first, a first molding material is injected from the first injection unit 10 toward a cavity formed by the fixed mold unit 20 and the movable mold unit 30. Next, a second molding material is injected from the second injection unit 12 toward the first molding material disposed in the cavity. Accordingly, a molded product made of the first molding material and the second molding material can be produced.

Hereinafter, members of the injection molding apparatus 100 will be described.

1.2. Injection Units

Figure 3:
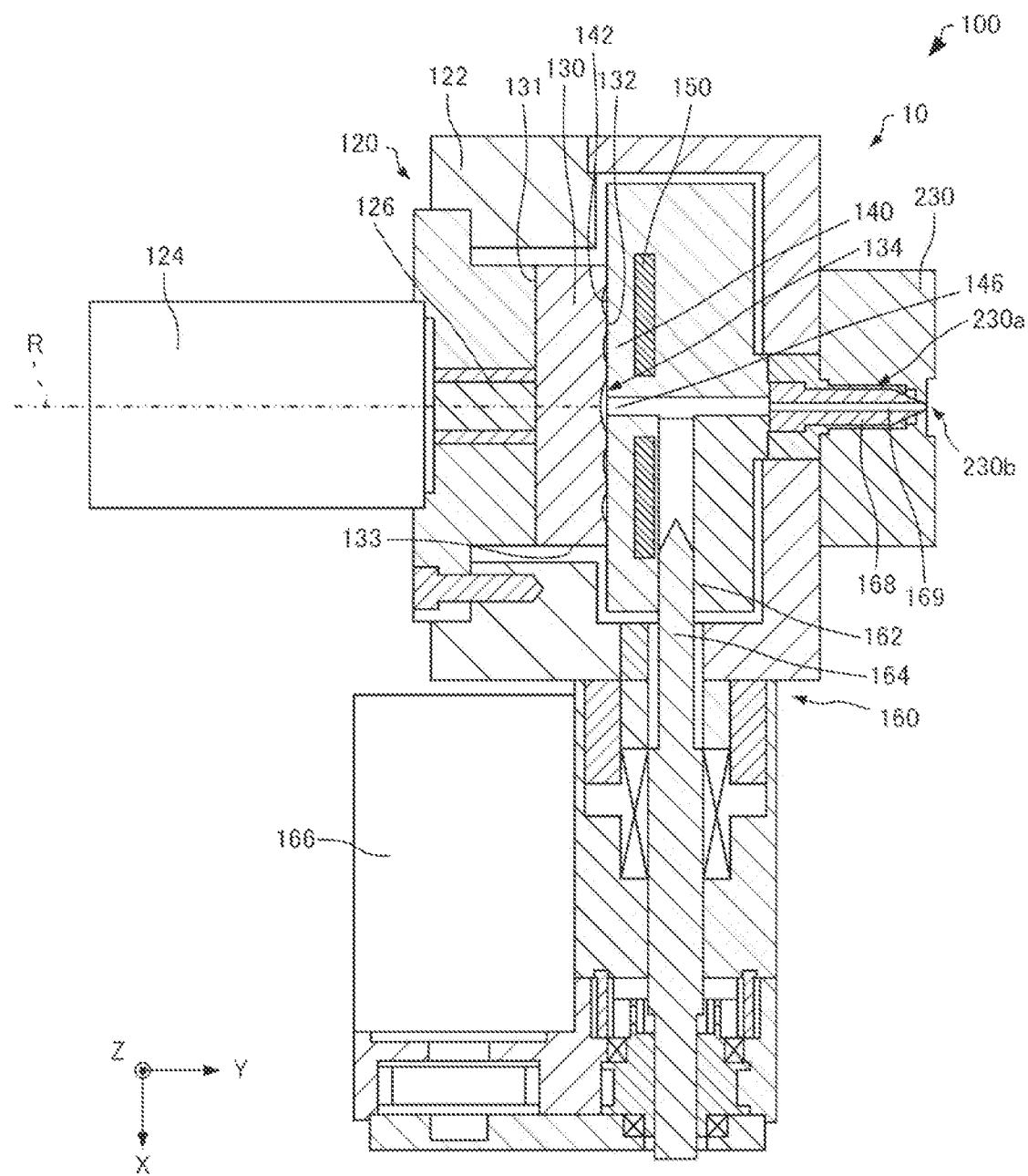
FIG. 3 is a cross-sectional view schematically showing a first injection unit of the injection molding apparatus according to the present embodiment.

FIG. 3 is a cross-sectional view schematically showing the first injection unit 10. As shown in FIGS. 1 to 3, the first injection unit 10 includes, for example, a material supply unit 110, a plasticizing unit 120, and an injection section 160.

The material supply unit 110 supplies, to the plasticizing unit 120, a material serving as a raw material. The material supply unit 110 is implemented by, for example, a hopper. A material in a form of pellets or powder is supplied to the material supply unit 110.

The plasticizing unit 120 is configured to plasticize the material supplied from the material supply unit 110, produce a first molding material in a paste form having fluidity, and direct the first molding material to the injection section 160. As shown in FIG. 3, the plasticizing unit 120 includes, for example, a screw case 122, a screw driving unit 124, a flat screw 130, a barrel 140, and a heating unit 150.

"Plasticizing" is a concept including melting, and refers to changing from a solid state to a state exhibiting fluidity. Specifically, for a material in which glass transition occurs, the "plasticizing" refers to raising a temperature of the material to be equal to or higher than a glass transition point. For a material in which glass transition does not occur, the "plasticizing" refers to raising a temperature of the material to be equal to or higher than a melting point.

The screw case 122 is a housing in which the flat screw 130 is housed. The flat screw 130 is housed in a space surrounded by the screw case 122 and the barrel 140.

The screw driving unit 124 is provided in the screw case 122. The screw driving unit 124 is implemented by, for example, a motor. The screw driving unit 124 rotates the flat screw 130. A shaft 126 coupled to the screw driving unit 124 is coupled to the flat screw 130. The screw driving unit 124 is controlled by the control unit 50. Although not illustrated, the shaft 126 and the flat screw 130 may be coupled to each other via a reducer.

The flat screw 130 has a substantially cylindrical shape in which a size in a direction of a rotation axis R is smaller than a size in a direction orthogonal to the direction of the rotation axis R. In an illustrated example, the rotation axis R is parallel to the Y-axis. Due to a torque generated by the screw driving unit 124, the flat screw 130 rotates about the rotation axis R. The flat screw 130 includes a main surface 131, a groove-formed surface 132 on an opposite side of the main surface 131, and a side surface 133 coupling the main surface 131 and the groove-formed surface 132. Here, FIG. 4 is a perspective view schematically showing the flat screw 130.

Figure 4:
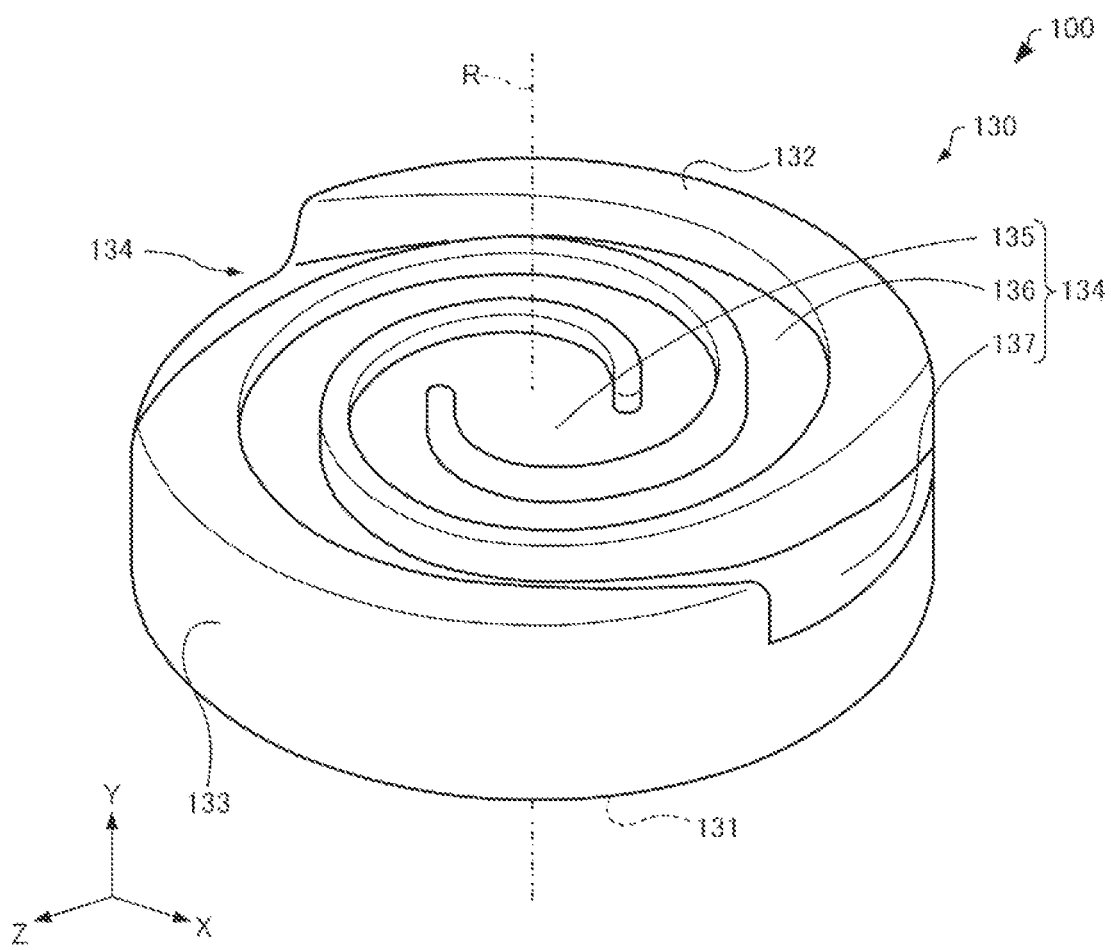
FIG. 4 is a perspective view schematically showing a flat screw of the injection molding apparatus according to the present embodiment.

As shown in FIG. 4, a first groove 134 is formed in the groove-formed surface 132 of the flat screw 130. The first groove 134 includes, for example, a central portion 135, a coupling portion 136, and a material introduction port 137. The central portion 135 faces a communication hole 146 formed in the barrel 140. The central portion 135 communicates with the communication hole 146. The coupling portion 136 couples the central portion 135 and the material introduction port 137. In an illustrated example, the coupling portion 136 is formed in a spiral shape from the central portion 135 toward an outer periphery of the groove-formed surface 132. The material introduction port 137 is formed on the outer periphery of the groove-formed surface 132. That is, the material introduction port 137 is formed in the side surface 133 of the flat screw 130. The material supplied from the material supply unit 110 is introduced from the material introduction port 137 into the first groove 134, passes through the coupling portion 136 and the central portion 135, and is conveyed to the communication hole 146 formed in the barrel 140. In the illustrated example, two first grooves 134 are formed.

The number of the first grooves 134 is not particularly limited. Although not illustrated, three or more first grooves 134 may be formed, or only one first groove 134 may be formed.

As shown in FIG. 3, the barrel 140 is provided to face the flat screw 130. The barrel 140 includes a facing surface 142 facing the groove-formed surface 132 of the flat screw 130. The communication hole 146 is formed in the center of the facing surface 142. Here, FIG. 5 is a diagram schematically showing the barrel 140.

Figure 5:
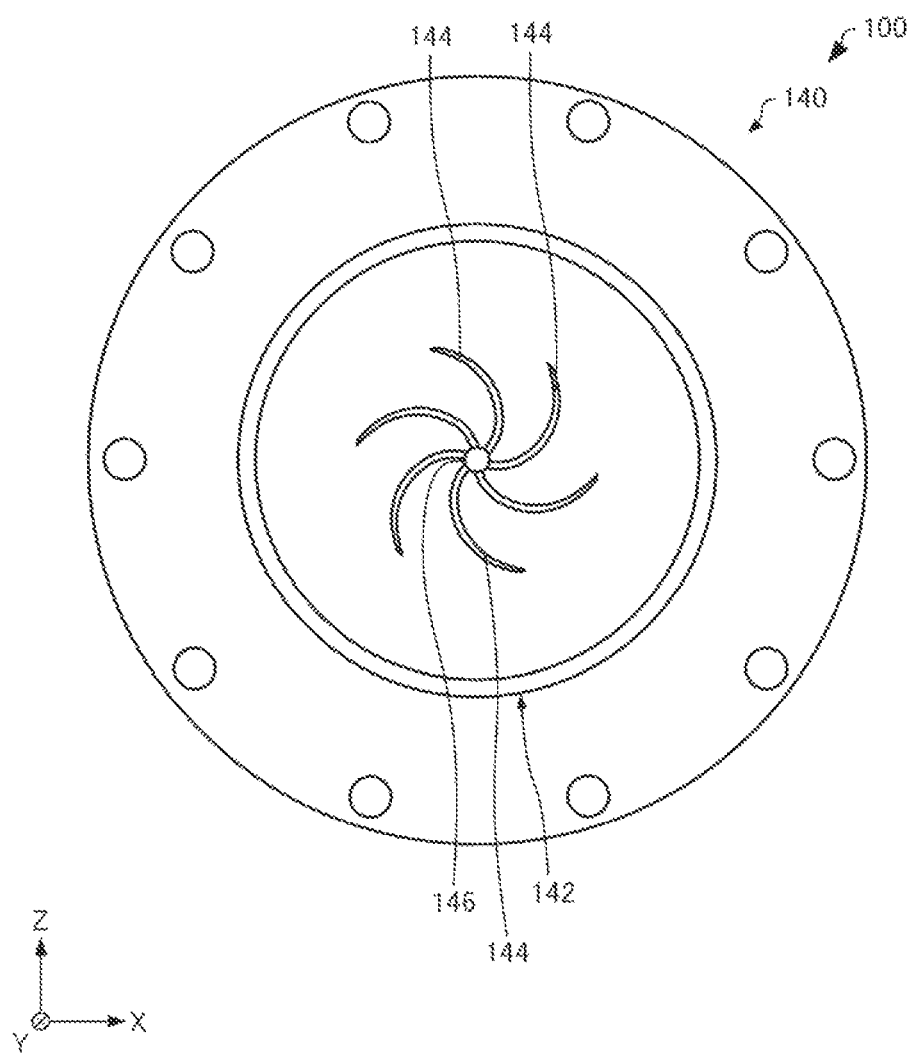
FIG. 5 is a diagram schematically showing a barrel of the injection molding apparatus according to the present embodiment.

As shown in FIG. 5, a second groove 144 and the communication hole 146 are formed in the facing surface 142 of the barrel 140. A plurality of the second grooves 144 are formed. In an illustrated example, six second grooves 144 are formed, but the number of the second grooves 144 is not particularly limited. The plurality of second grooves 144 are formed around the communication hole 146 when viewed from the Y-axis direction. The second grooves 144 each have one end coupled to the communication hole 146, and extend in a spiral shape from the communication hole 146 toward an outer periphery of the facing surface 142. The second groove 144 has a function of directing the plasticized first molding material to the communication hole 146.

A shape of the second groove 144 is not particularly limited, and may be a linear shape. The one end of the second groove 144 may not be coupled to the communication hole 146. Further, the second groove 144 may not be formed in the facing surface 142. However, in consideration of efficiently directing the first molding material to the communication hole 146, the second groove 144 may be formed in the facing surface 142.

As shown in FIG. 3, the heating unit 150 is provided in the barrel 140. The heating unit 150 heats the material supplied between the flat screw 130 and the barrel 140. An output of the heating unit 150 is controlled by the control unit 50. The plasticizing unit 120 produces the plasticized first molding material by heating the supplied material while conveying the supplied material toward the communication hole 146 by the flat screw 130, the barrel 140, and the heating unit 150, and causes the produced first molding material to flow out from the communication hole 146 to the injection section 160.

The injection section 160 injects the first molding material produced by the plasticizing unit 120 toward the movable mold unit 30. The injection section 160 includes, for example, a cylinder 162, a plunger 164, a plunger driving unit 166, and a nozzle 168. The cylinder 162 is a substantially cylindrical member coupled to the communication hole 146. The plunger 164 moves inside the cylinder 162. The plunger 164 is driven by the plunger driving unit 166 including a motor, a gear, and the like. The plunger driving unit 166 is controlled by the control unit 50.

The injection section 160 performs a metering operation and an injection operation by sliding the plunger 164 in the cylinder 162. The metering operation refers to an operation of directing the first molding material located in the communication hole 146 into the cylinder 162 by moving the plunger 164 in a +X-axis direction away from the communication hole 146, and metering the first molding material in the cylinder 162. The injection operation refers to an operation of injecting the first molding material in the cylinder 162 toward the movable mold unit 30 through the nozzle 168 by moving the plunger 164 in a −X-axis direction approaching the communication hole 146.

The nozzle 168 injects the first molding material toward the movable mold unit 30. A nozzle insertion hole 230a into which the nozzle 168 is inserted, and a first gate opening 230b through which the first molding material injected from the nozzle 168 passes, are formed in a first fixed mold 230 attached to the fixed mold unit 20. A nozzle hole 169 communicating with the communication hole 146 is formed in the nozzle 168. By performing the metering operation and the injection operation described above, the first molding material metered in the cylinder 162 is sent to the nozzle hole 169 through the communication hole 146. Then, the nozzle 168 injects the first molding material from the nozzle hole 169 through the first gate opening 230b. For convenience, in FIG. 3, an illustration of the fixed mold unit 20 is simplified or omitted.

The material supply unit 110 of the second injection unit 12 is supplied with a raw material different from the raw material that is supplied to the material supply unit 110 of the first injection unit 10. The second injection unit 12 injects the second molding material different from the first molding material through a second gate opening 232b of a second fixed mold 232. The second injection unit 12 has basically the same configuration as that of the first injection unit 10. Therefore, a detailed description thereof is omitted.

1.3. Fixed Mold Unit

Figure 6:
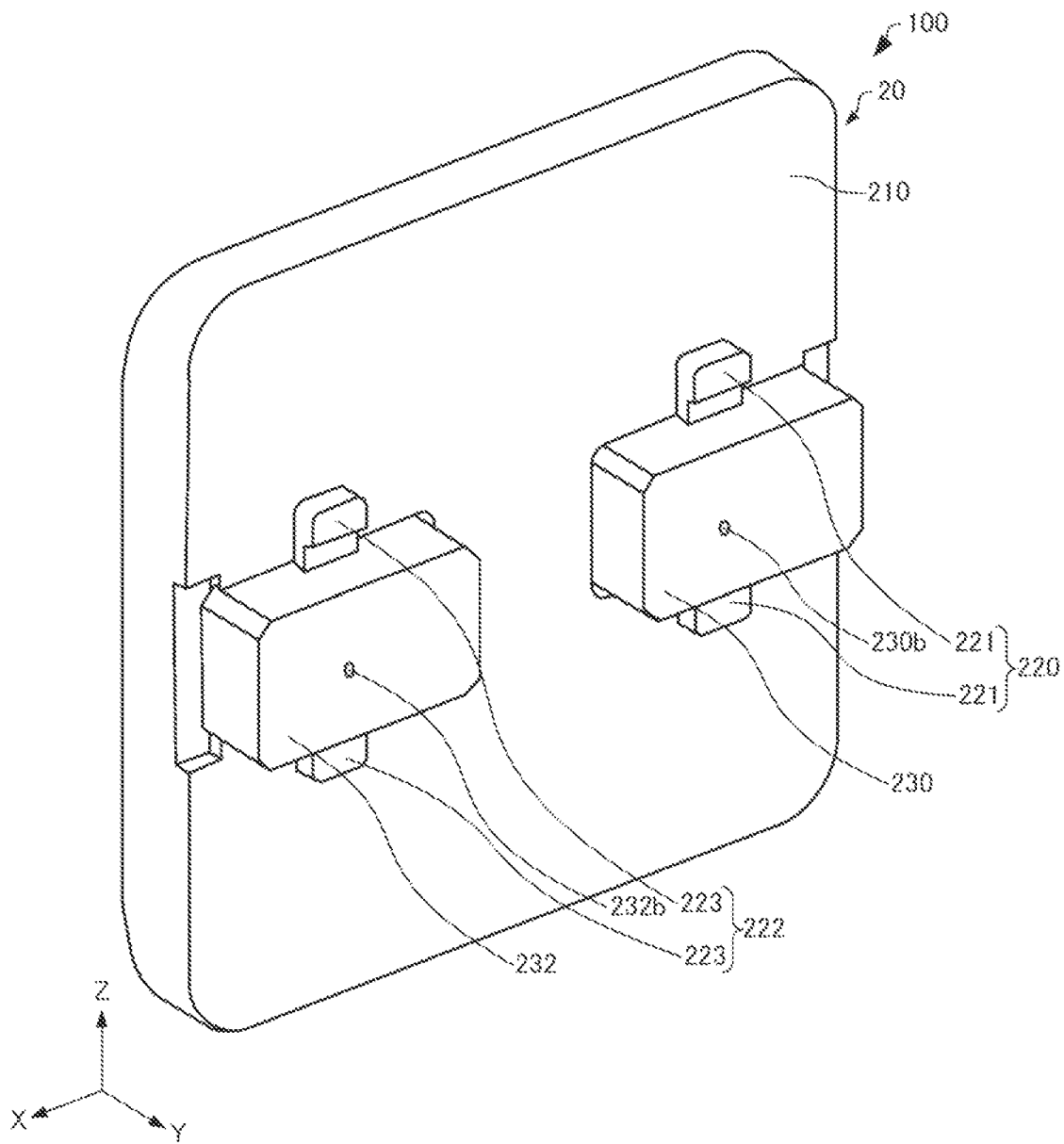
FIG. 6 is a perspective view schematically showing a fixed mold unit of the injection molding apparatus according to the present embodiment.

FIG. 6 is a perspective view schematically showing the fixed mold unit 20. As shown in FIGS. 2 and 6, the fixed mold unit 20 includes, for example, a fixed plate 210, a first fixed mold attachment and detachment unit 220, a second fixed mold attachment and detachment unit 222, and biasing members 240. For convenience, the first fixed mold 230 and the second fixed mold 232 are not illustrated in FIG. 2. For convenience, the biasing members 240 are not illustrated in FIG. 6.

The fixed plate 210 is substantially plate-shaped. As shown in FIG. 2, the fixed plate 210 is fixed to a support base 60 via a support rod 62. In the illustrated example, the first injection unit 10 and the second injection unit 12 are coupled to a surface of the fixed plate 210 facing a −Y-axis direction.

The first fixed mold attachment and detachment unit 220 and the second fixed mold attachment and detachment unit 222 are provided on the fixed plate 210. In the illustrated example, the fixed mold attachment and detachment units 220 and 222 are provided on a surface of the fixed plate 210 facing a +Y-axis direction. The fixed mold attachment and detachment units 220 and 222 are, for example, provided side by side in the X-axis direction.

The first fixed mold attachment and detachment unit 220 is configured to attach and detach the first fixed mold 230. In an example shown in FIG. 6, the first fixed mold attachment and detachment unit 220 includes a pair of holding portions 221, and holds the first fixed mold 230 by sandwiching the first fixed mold 230 with the pair of holding portions 221. The second fixed mold attachment and detachment unit 222 is configured to attach and detach the second fixed mold 232. In the illustrated example, the second fixed mold attachment and detachment unit 222 includes a pair of holding portions 223, and holds the second fixed mold 232 by sandwiching the second fixed mold 232 with the pair of holding portions 223.

The first fixed mold 230 is held by the first fixed mold attachment and detachment unit 220. The first gate opening 230b through which the first molding material is injected is formed in a surface of the first fixed mold 230 facing the +Y-axis direction. Further, a recess constituting a cavity and not illustrated is formed in the surface of the first fixed mold 230 facing the +Y-axis direction.

The second fixed mold 232 is held by the second fixed mold attachment and detachment unit 222. The second gate opening 232b through which the second molding material is injected is formed in a surface of the second fixed mold 232 facing the +Y-axis direction. Further, a recess constituting a cavity and not illustrated is formed in the surface of the second fixed mold 232 facing the +Y-axis direction. A material for the fixed mold 230 or 232 is, for example, a metal, a ceramic, or a resin.

As shown in FIG. 2, the biasing members 240 are provided on the fixed plate 210. The biasing members 240 bias a rotation disk 346 of the movable mold unit 30 toward a movable plate 310 when mold opening is performed after mold clamping is performed. In the illustrated example, the biasing members 240 bias the rotation disk 346 toward the movable plate 310 when the movable mold unit 30 moves in the +Y-axis direction after the mold clamping is performed. The biasing members 240 are made of an elastic body. The biasing members 240 can prevent the rotation disk 346 from being left at the fixed mold unit 20 when the mold opening is performed.

The "mold clamping" refers to moving the movable mold unit 30 in a direction approaching the fixed mold unit 20 to bring the first fixed mold 230 into contact with a first movable mold 330 or a second movable mold 332. The "mold opening" refers to moving the movable mold unit 30 in a direction away from the fixed mold unit 20 to separate the first fixed mold 230 from the first movable mold 330 or the second movable mold 332.

1.4. Movable Mold Unit

Figure 7:
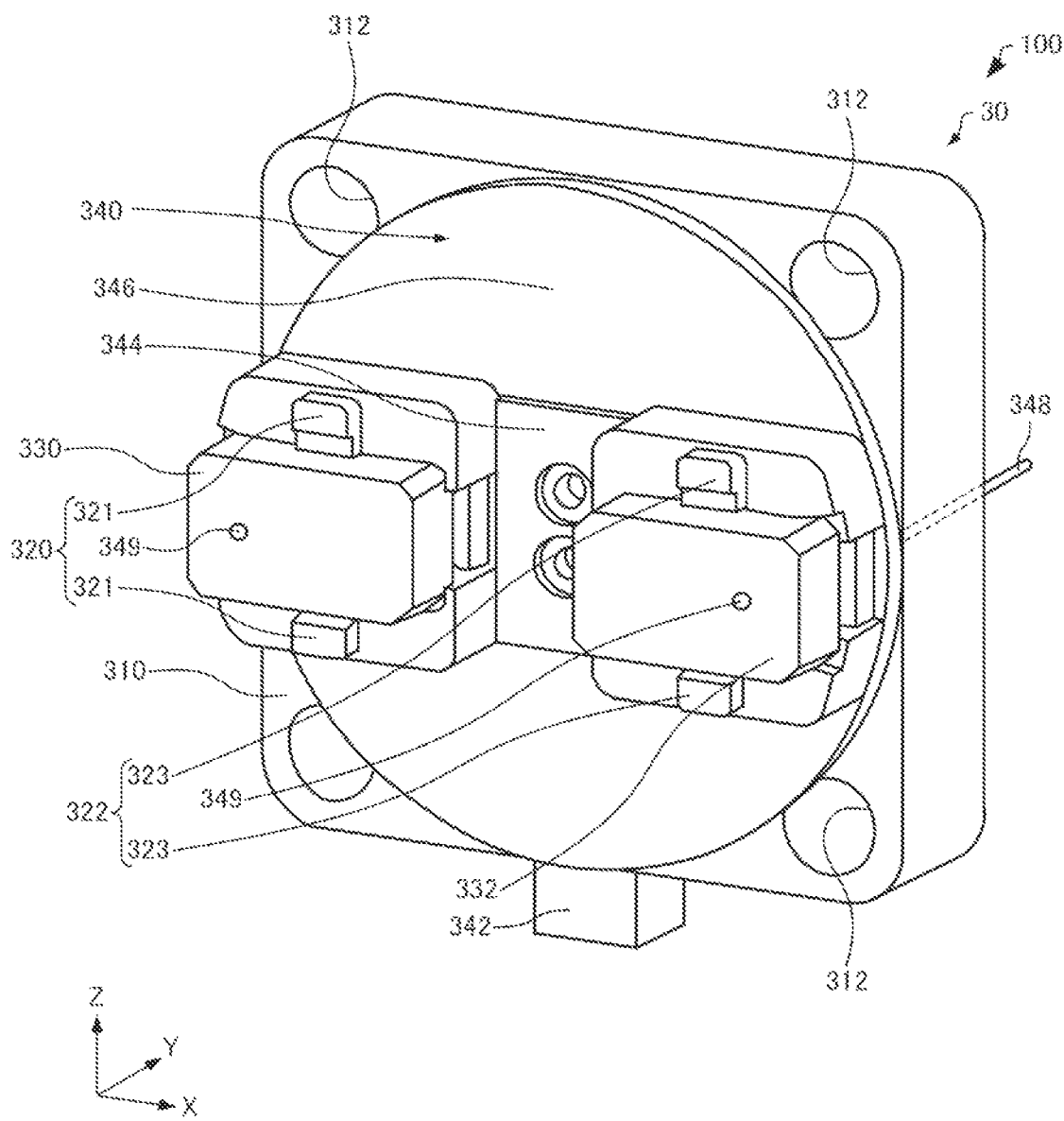
FIG. 7 is a perspective view schematically showing a movable mold unit of the injection molding apparatus according to the present embodiment.

FIG. 7 is a perspective view schematically showing the movable mold unit 30. As shown in FIGS. 2 and 7, the movable mold unit 30 includes the movable plate 310, a first movable mold attachment and detachment unit 320, a second movable mold attachment and detachment unit 322, and a position changing unit 340. For convenience, the first movable mold 330 and the second movable mold 332 are not illustrated in FIG. 2.

The movable plate 310 is substantially plate-shaped. As shown in FIG. 7, through holes 312 are formed in four corners of the movable plate 310. As shown in FIG. 1, tie bars 64 pass through the through holes 312, respectively.

The tie bars 64 couple the fixed mold unit 20 and the mold clamping unit 40. The movable plate 310 is movable in the Y-axis direction by the mold clamping unit 40.

The first movable mold attachment and detachment unit 320 and the second movable mold attachment and detachment unit 322 are provided on the rotation disk 346 of the position changing unit 340. The first movable mold attachment and detachment unit 320 is configured to attach and detach the first movable mold 330. In an example shown in FIG. 7, the first movable mold attachment and detachment unit 320 includes a pair of holding portions 321, and holds the first movable mold 330 by sandwiching the first movable mold 330 with the pair of holding portions 321. The second movable mold attachment and detachment unit 322 is configured to attach and detach the second movable mold 332. In the illustrated example, the second movable mold attachment and detachment unit 322 includes a pair of holding portions 323, and holds the second movable mold 332 by sandwiching the second movable mold 332 with the pair of holding portions 323.

The first movable mold 330 is held by the first movable mold attachment and detachment unit 320. A recess constituting a cavity and not illustrated is formed in a surface of the first movable mold 330 facing the −Y-axis direction. The first movable mold 330 is configured to be clamped with the first fixed mold 230 or the second fixed mold 232. That is, the cavity can be formed by the recess formed in the first movable mold 330 and the recess formed in the first fixed mold 230, or the cavity can be formed by the recess formed in the first movable mold 330 and the recess formed in the second fixed mold 232.

The second movable mold 332 is held by the second movable mold attachment and detachment unit 322. A recess constituting a cavity and not illustrated is formed in a surface of the second movable mold 332 facing the −Y-axis direction. The second movable mold 332 is configured to be clamped with the first fixed mold 230 or the second fixed mold 232. That is, the cavity can be formed by the recess formed in the second movable mold 332 and the recess formed in the first fixed mold 230, or the cavity can be formed by the recess formed in the second movable mold 332 and the recess formed in the second fixed mold 232. A material for the movable mold 330 or 332 is, for example, a metal, a ceramic, or a resin.

The position changing unit 340 is coupled to the movable plate 310. The position changing unit 340 includes, for example, a driving unit 342, a rotation shaft member 344, the rotation disk 346, and an eject mechanism 348. For convenience, the eject mechanism 348 is not illustrated in FIG. 2.

The driving unit 342 rotates the rotation shaft member 344. The driving unit 342 includes, for example, a motor. In the example shown in FIG. 2, a torque generated by the driving unit 342 is transmitted to the rotation shaft member 344 via a belt 341 and a pulley 343.

Figure 8:
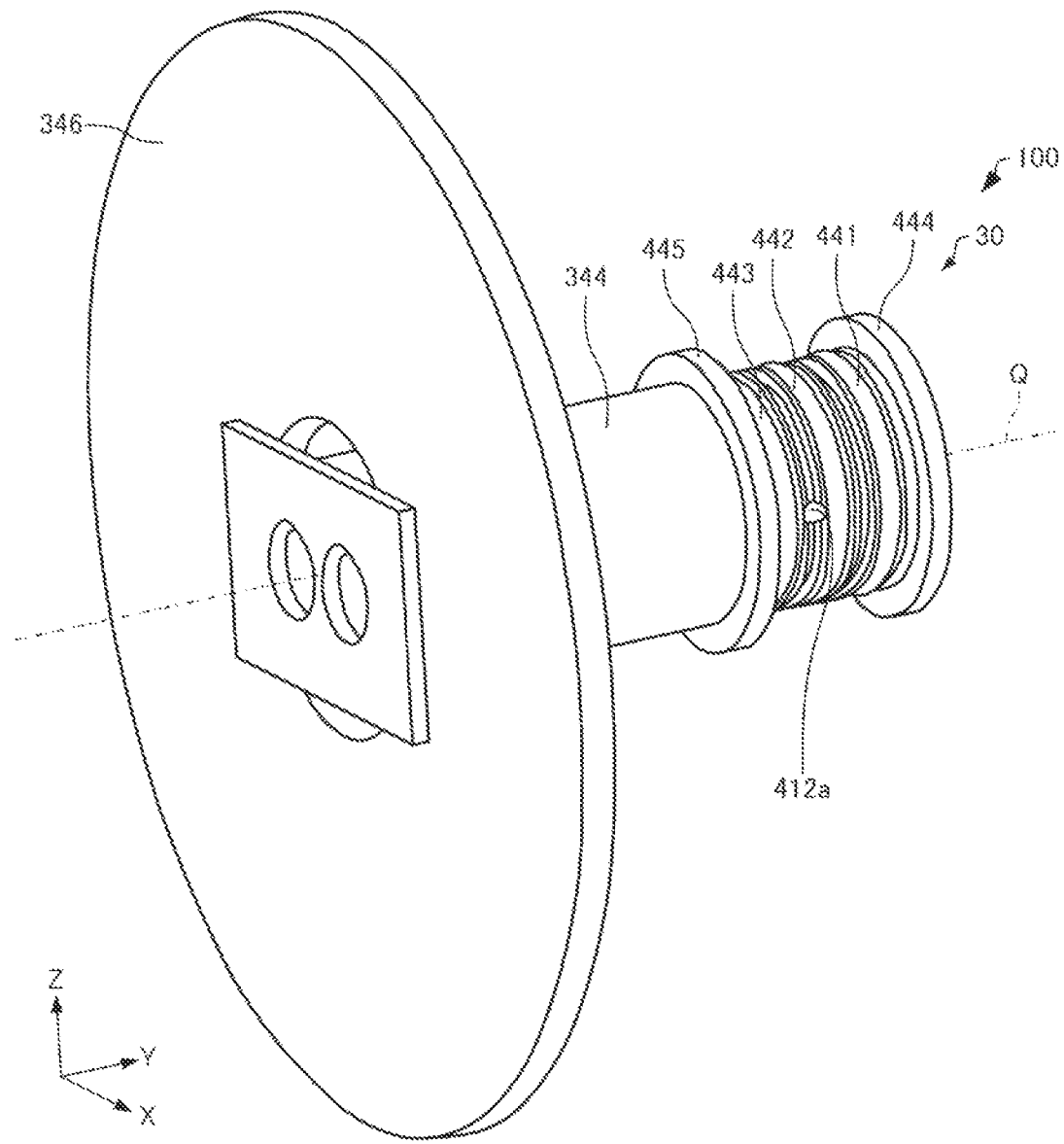
FIG. 8 is a perspective view schematically showing the movable mold unit of the injection molding apparatus according to the present embodiment.

The rotation shaft member 344 is rotated by the driving unit 342. Here, FIG. 8 is a perspective view schematically showing the rotation shaft member 344 and the rotation disk 346. As shown in FIG. 8, a shape of the rotation shaft member 344 is a substantially tubular shape. The rotation shaft member 344 rotates about a rotation axis Q. In an illustrated example, a direction of the rotation axis Q is the Y-axis direction. As shown in FIG. 2, the rotation shaft member 344 is rotatably held by the movable plate 310 via the pulley 343. An internal structure of the rotation shaft member 344 will be described later.

The rotation disk 346 is coupled to the rotation shaft member 344. A shape of the rotation disk 346 is a substantially disk shape. The rotation disk 346 rotates about the rotation axis Q of the rotation shaft member 344 with rotation of the rotation shaft member 344. The first movable mold attachment and detachment unit 320 and the second movable mold attachment and detachment unit 322 are provided on the rotation disk 346. In the illustrated example, the movable mold attachment and detachment units 320 and 322 are provided on a surface of the rotation disk 346 facing the −Y-axis direction.

By rotating the rotation disk 346, the position changing unit 340 changes a position of the first movable mold attachment and detachment unit 320 such that the first movable mold 330 is located at a position facing the first fixed mold 230 or the second fixed mold 232. Further, the position changing unit 340 changes a position of the second movable mold attachment and detachment unit 322 such that the second movable mold 332 is located at a position facing the first fixed mold 230 or the second fixed mold 232. Specifically, the position changing unit 340 locates the second movable mold 332 at a position facing the second fixed mold 232 when the first movable mold 330 is located at a position facing the first fixed mold 230, or locates the second movable mold 332 at a position facing the first fixed mold 230 when the first movable mold 330 is located at a position facing the second fixed mold 232.

As shown in FIG. 7, the eject mechanism 348 is provided on the movable plate 310. The eject mechanism 348 is a mechanism that removes, from the first movable mold 330 or the second movable mold 332, the molded product molded by sequentially injecting the first molding material and the second molding material. In the illustrated example, the eject mechanism 348 is a pin and is movable in the Y-axis direction by a driving unit not illustrated. Through holes 349 through which the eject mechanism 348 passes are formed in the movable molds 330 and 332, respectively.

The eject mechanism 348 is provided at a position facing the second fixed mold 232. An eject mechanism is not provided at a position facing the first fixed mold 230. After the second molding material is injected from the second gate opening 232b of the second fixed mold 232, the eject mechanism 348 can move in the −Y-axis direction through the through hole 349 to push out the molded product remaining in the first movable mold 330 or the second movable mold 332.

1.5. Mold Clamping Unit

The mold clamping unit 40 advances and retracts, in an injection direction, the movable mold unit 30 including the rotation shaft member 344 and the rotation disk 346. The driving unit 342 moves in conjunction with the rotation disk 346. The mold clamping unit 40 moves the driving unit 342 in conjunction with the rotation shaft member 344. The injection direction refers to a direction in which the first molding material is injected from the first injection unit 10, and is the Y-axis direction in the illustrated example. As shown in FIG. 2, the mold clamping unit 40 includes, for example, a mold clamping plate 42, a mold driving unit 44, and a ball screw portion 46.

The mold clamping plate 42 is fixed to the support base 60 via a support rod 66. The mold clamping plate 42 is a substantially plate-shaped member.

The mold driving unit 44 is coupled to the mold clamping plate 42. For example, the mold driving unit 44 includes a motor, a gear, and the like. The mold driving unit 44 is coupled to the movable mold unit 30 via the ball screw portion 46. Driving of the mold driving unit 44 is controlled by the control unit 50. The ball screw portion 46 transmits power generated by the driving of the mold driving unit 44 to the movable mold unit 30. The ball screw portion 46 is movable in the Y-axis direction with respect to the mold clamping plate 42. The mold clamping unit 40 moves the movable mold unit 30 by the mold driving unit 44 and the ball screw portion 46, thereby performing the mold clamping and the mold opening.

An output of the mold driving unit 44 is larger than an output of the plunger driving unit 166. Therefore, the mold clamping unit 40 can reliably perform the mold clamping. If the output of the plunger driving unit 166 is larger than the output of the mold driving unit 44, the molding material may leak out of the cavity. The output of the mold driving unit 44 is, for example, larger than an output of the screw driving unit 124.

An output of the screw driving unit 124 of the first injection unit 10 and an output of the screw driving unit 124 of the second injection unit 12 may be the same as each other, or may be different from each other. In addition, an output of the plunger driving unit 166 of the first injection unit 10 and an output of the plunger driving unit 166 of the second injection unit 12 may be the same as each other, or may be different from each other.

The ball screw portion 46 is coupled to a housing 350 of the movable mold unit 30 via a spacer 48. The ball screw portion 46, the spacer 48, and the housing 350 do not rotate based on driving of the driving unit 342 of the movable mold unit 30. A clearance may be provided between the ball screw portion 46 and the rotation shaft member 344. A clearance may be provided between the housing 350 and the pulley 343. A part of the rotation shaft member 344 is housed in the housing 350.

1.6. Control Unit

For example, the control unit 50 is implemented by a computer including a processor, a main storage device, and an input and output interface through which a signal is input and output to and from the outside. The control unit 50 exerts various functions by, for example, the processor executing a program read into the main storage device. Specifically, the control unit 50 controls the injection units 10 and 12, the movable mold unit 30, and the mold clamping unit 40. The control unit 50 may be implemented by a combination of a plurality of circuits instead of the computer. Here, FIG. 9 is a flowchart illustrating processing of the control unit 50.

For example, a user operates an operation unit not illustrated, to output a processing start signal for starting the processing to the control unit 50. The operation unit is implemented by, for example, a mouse, a keyboard, a touch panel, and the like. Upon receiving the processing start signal, the control unit 50 starts molded product production processing.

Figure 9:
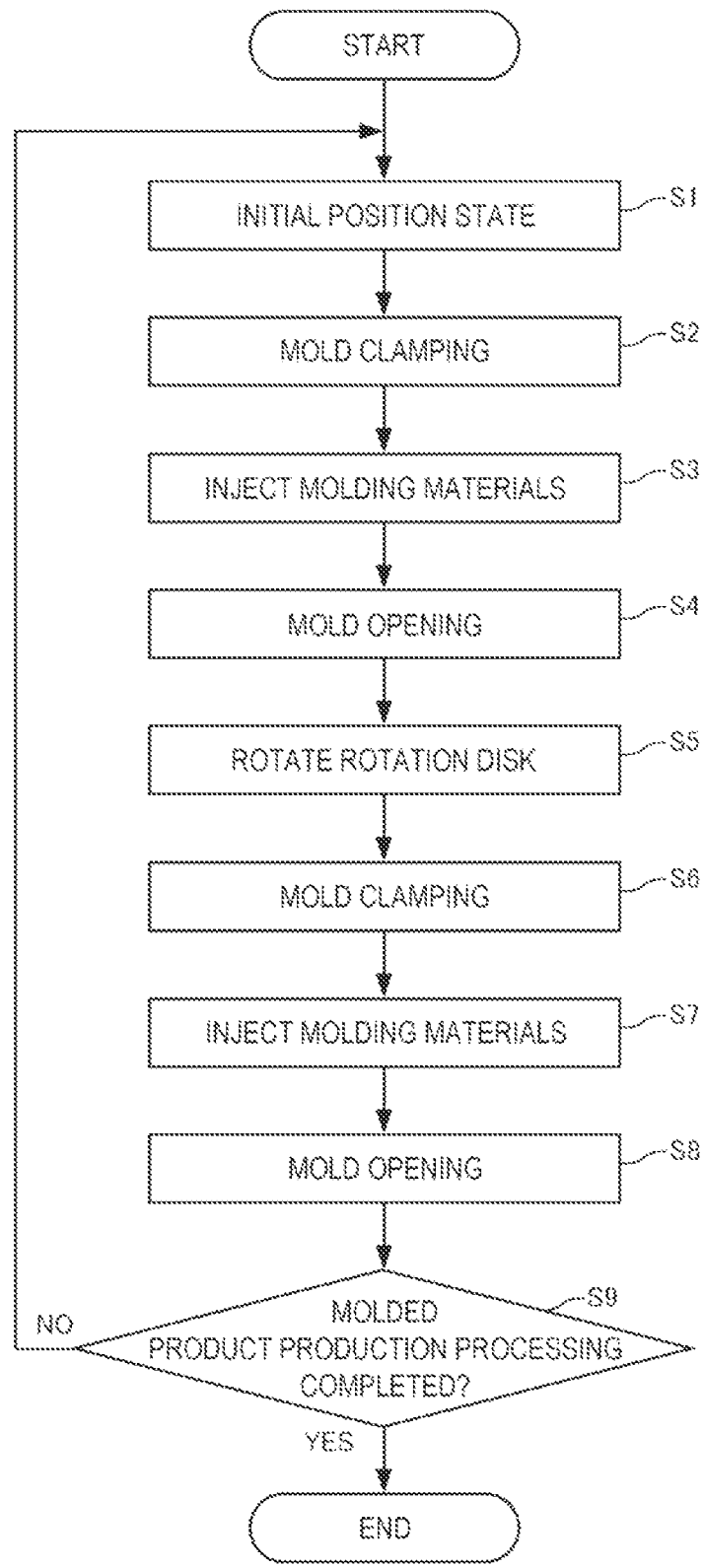
FIG. 9 is a flowchart illustrating molded product production processing of a control unit of the injection molding apparatus according to the present embodiment.

First, as shown in FIG. 9, in step S1, the control unit 50 controls the mold clamping unit 40 and the position changing unit 340 to cause the fixed molds 230 and 232 and the movable molds 330 and 332 to be in an initial position state (step S1). The initial position state is a mold opening state in which the fixed molds 230 and 232 are separated from the movable molds 330 and 332. Further, in the initial position state, the first fixed mold 230 and the first movable mold 330 face each other, and the second fixed mold 232 and the second movable mold 332 face each other.

Next, in step S2, the control unit 50 controls the mold clamping unit 40 to move the movable molds 330 and 332 in the −Y-axis direction, to bring the first fixed mold 230 into contact with the first movable mold 330, and to bring the second fixed mold 232 into contact with the second movable mold 332, thereby performing the mold clamping.

Next, in step S3, the control unit 50 controls the injection units 10 and 12 to inject the first molding material and the second molding material. Specifically, the control unit 50 controls the first injection unit 10 to inject the first molding material into the cavity formed by the first fixed mold 230 and the first movable mold 330. Further, the control unit 50 controls the second injection unit 12 to inject the second molding material into the cavity formed by the second fixed mold 232 and the second movable mold 332.

Next, in step S4, the control unit 50 controls the mold clamping unit 40 to move the movable molds 330 and 332 in the +Y-axis direction, thereby performing the mold opening. The control unit 50 controls the eject mechanism 348 while performing the mold opening, so as to push out an intermediate product remaining in the second movable mold 332 and to remove the intermediate product from the second movable mold 332. The intermediate product is made of only the second molding material, and is not the molded product. The control unit 50 returns the eject mechanism 348 to an initial position after pushing out the intermediate product. An intermediate product, which is made of the first molding material and to be the molded product, remains in the first movable mold 330.

Next, in step S5, the control unit 50 controls the position changing unit 340 to rotate the rotation disk 346, so that the first fixed mold 230 and the second movable mold 332 face each other, and the second fixed mold 232 and the first movable mold 330 face each other. For example, the control unit 50 controls the position changing unit 340 to rotate the rotation disk 346 by 180° about the rotation axis Q.

Next, in step S6, the control unit 50 controls the mold clamping unit 40 to move the movable molds 330 and 332 in the −Y-axis direction, to bring the first fixed mold 230 into contact with the second movable mold 332, and to bring the second fixed mold 232 into contact with the first movable mold 330, thereby performing the mold clamping.

Next, in step S7, the control unit 50 controls the injection units 10 and 12 to inject the first molding material and the second molding material. Specifically, the control unit 50 controls the first injection unit 10 to inject the first molding material into the cavity formed by the first fixed mold 230 and the second movable mold 332. Further, the control unit 50 controls the second injection unit 12 to inject the second molding material into the cavity formed by the second fixed mold 232 and the first movable mold 330. The intermediate product made of the first molding material that is injected in step S3 remains in the first movable mold 330. By injecting the second molding material to the intermediate product, the molded product made of the first molding material and the second molding material can be molded.

Next, in step S8, the control unit 50 controls the mold clamping unit 40 to move the movable molds 330 and 332 in the +Y-axis direction, thereby performing the mold opening. The control unit 50 controls the eject mechanism 348 while performing the mold opening, so as to push out the molded product remaining in the first movable mold 330 and to remove the molded product from the first movable mold 330.

Next, in step S9, the control unit 50 determines whether or not the molded product production processing is completed. For example, the control unit 50 determines whether or not a predetermined time has elapsed after the molded product production processing is started. The control unit 50 ends the molded product production processing when it is determined that the predetermined time has elapsed ("YES"

in step S9). The control unit 50 returns the processing to step S1 when it is determined that the predetermined time has not elapsed ("NO" in step S9).

Alternatively, in step S9, the control unit 50 determines whether or not the number of operations of the eject mechanism 348 is equal to or more than a predetermined number. The control unit 50 ends the molded product production processing when it is determined that the number of operations is equal to or more than the predetermined number ("YES" in step S9). The control unit 50 returns the processing to step S1 when it is determined that the number of operations is less than the predetermined number ("NO" in step S9).

When the processing returns to step S1, in step S3 performed for the second and subsequent times, the control unit 50 controls the second injection unit 12 to inject the second molding material toward the intermediate product made of the first molding material. Therefore, in step S4 performed for the second and subsequent times, the control unit 50 controls the eject mechanism 348 to push out the molded product remaining in the second movable mold 332.

Considering that the second molding material is wasted, the second molding material may not be injected from the second injection unit 12 in step S3 performed for the first time. However, in consideration of simplification of the program of the control unit 50, the second molding material may be injected from the second injection unit 12 in step S3 performed for the first time.

1.7. Rotation Shaft Member

As shown in FIG. 2, a flow path 410 communicating with the first movable mold 330 and the second movable mold 332 is formed in the rotation shaft member 344. The flow path 410 includes a first axial flow path 411 and a second axial flow path 412. The first axial flow path 411 and the second axial flow path 412 are separated from each other. The axial flow paths 411 and 412 are individually formed from a side surface 402 to a bottom surface 404 of the rotation shaft member 344. In the illustrated example, the bottom surface 404 is a surface of the rotation shaft member 344 facing the −Y-axis direction. A medium for cooling the movable molds 330 and 332 flows through the axial flow paths 411 and 412. Examples of the medium include water.

Figure 10:
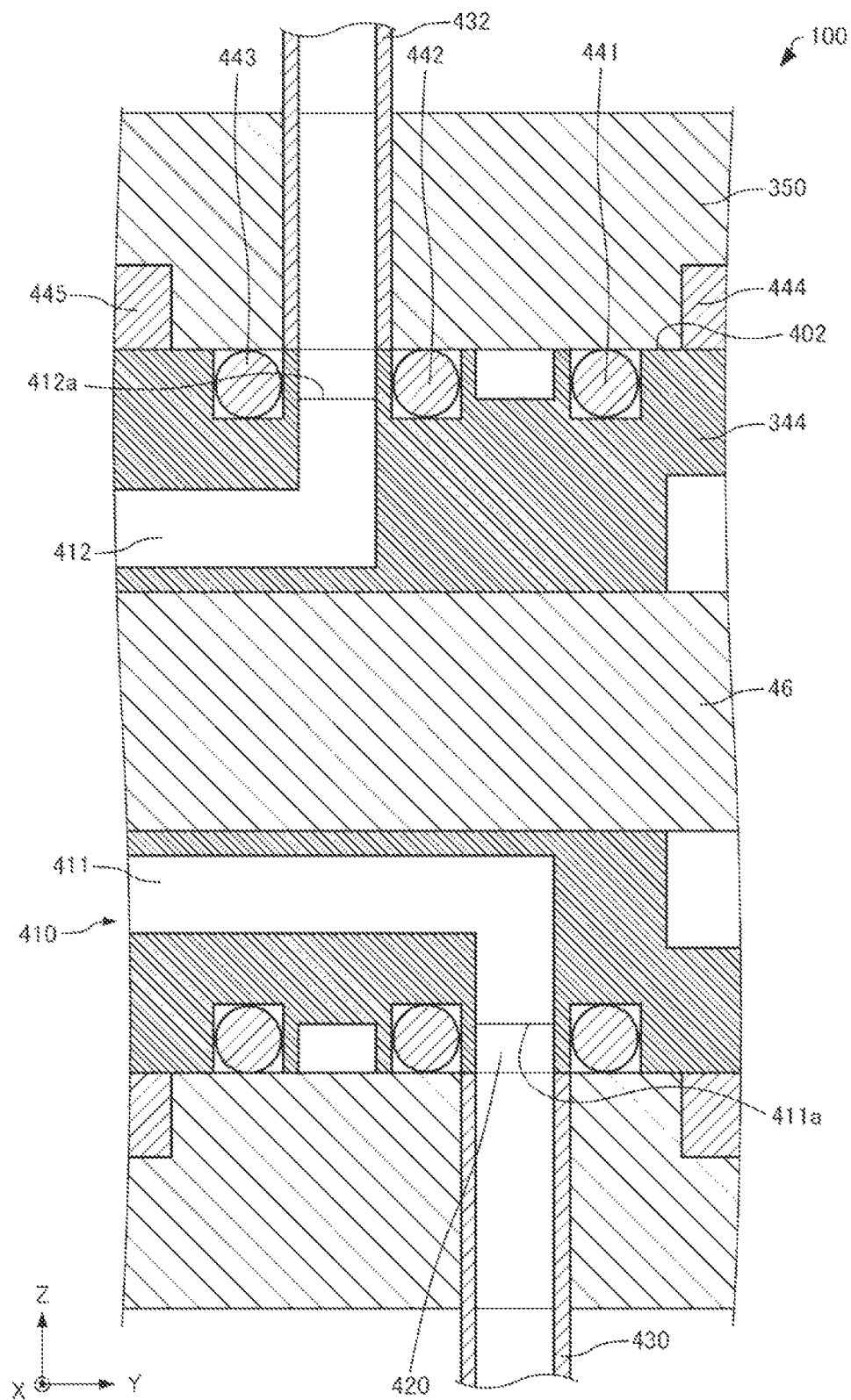
FIG. 10 is a cross-sectional view schematically showing a rotation shaft member of the injection molding apparatus according to the present embodiment.
Figure 11:
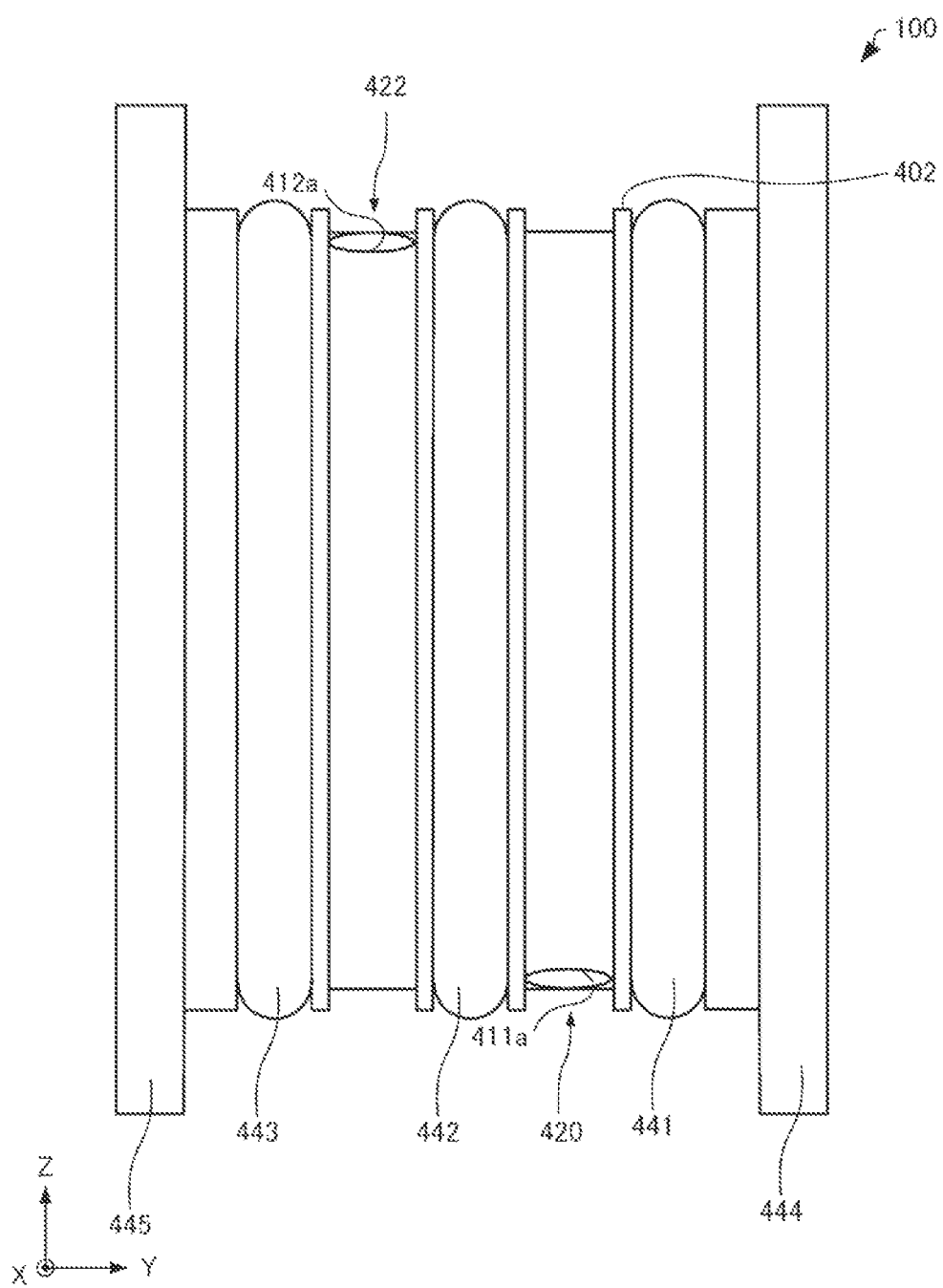
FIG. 11 is a diagram schematically showing the rotation shaft member of the injection molding apparatus according to the present embodiment.

An inflow groove 420 and an outflow groove 422 are formed in the side surface 402 of the rotation shaft member 344. Here, FIG. 10 is a cross-sectional view schematically showing the vicinity of the inflow groove 420 and the outflow groove 422 of the rotation shaft member 344. FIG. 11 is a diagram schematically showing the vicinity of the inflow groove 420 and the outflow groove 422 of the rotation shaft member 344.

As shown in FIGS. 10 and 11, the inflow groove 420 and the outflow groove 422 are separated from each other. The inflow groove 420 and the outflow groove 422 each encircle the side surface 402. In other words, the inflow groove 420 and the outflow groove 422 are formed in the side surface 402 over 360°.

The inflow groove 420 is coupled to a medium inflow port 411*a* of the first axial flow path 411. The medium inflow port 411*a* is formed on a bottom surface of the inflow groove 420. The medium inflow port 411*a* has, for example, a circular shape. The outflow groove 422 is coupled to a medium outflow port 412*a* of the second axial flow path 412. The medium outflow port 412*a* is formed on a bottom surface of the outflow groove 422. The medium outflow port 412*a* has, for example, a circular shape. The medium inflow port 411*a* and the medium outflow port 412*a* face each other in opposite directions.

As shown in FIG. 10, the inflow groove 420 is coupled to an inflow pipe 430. The inflow pipe 430 penetrates through the housing 350. The inflow pipe 430 is coupled to, for example, a pump not illustrated in order to circulate the medium. The outflow groove 422 is coupled to an outflow pipe 432. The outflow pipe 432 penetrates through the housing 350. The inflow pipe 430 and the outflow pipe 432 do not rotate with the rotation of the rotation shaft member 344. For convenience, the inflow pipe 430 and the outflow pipe 432 are not illustrated in FIG. 2. In addition, the housing 350, the inflow pipe 430, and the outflow pipe 432 are not illustrated in FIG. 11.

As shown in FIGS. 10 and 11, packing 441, 442, 443, 444, and 445 are provided in the side surface 402 of the rotation shaft member 344. The inflow groove 420 is provided between the first packing 441 and the second packing 442. The outflow groove 422 is provided between the second packing 442 and the third packing 443. As the packing 441, 442, and 443, for example, O-rings are used. The packing 441 and 442 can reduce a possibility that the medium flowing through the inflow groove 420 leaks to the outside. The packing 442 and 443 can reduce a possibility that the medium flowing through the outflow groove 422 leaks to the outside. The fourth packing 444 is provided in the +Y-axis direction of the first packing 441. The fifth packing 445 is provided in the −Y-axis direction of the third packing 443. The packing 444 and 445 can further reduce the possibility that the medium leaks to the outside. For example, the packing 441, 442, 443, 444, and 445 rotate with the rotation of the rotation shaft member 344 while in contact with the housing 350.

Figure 12:
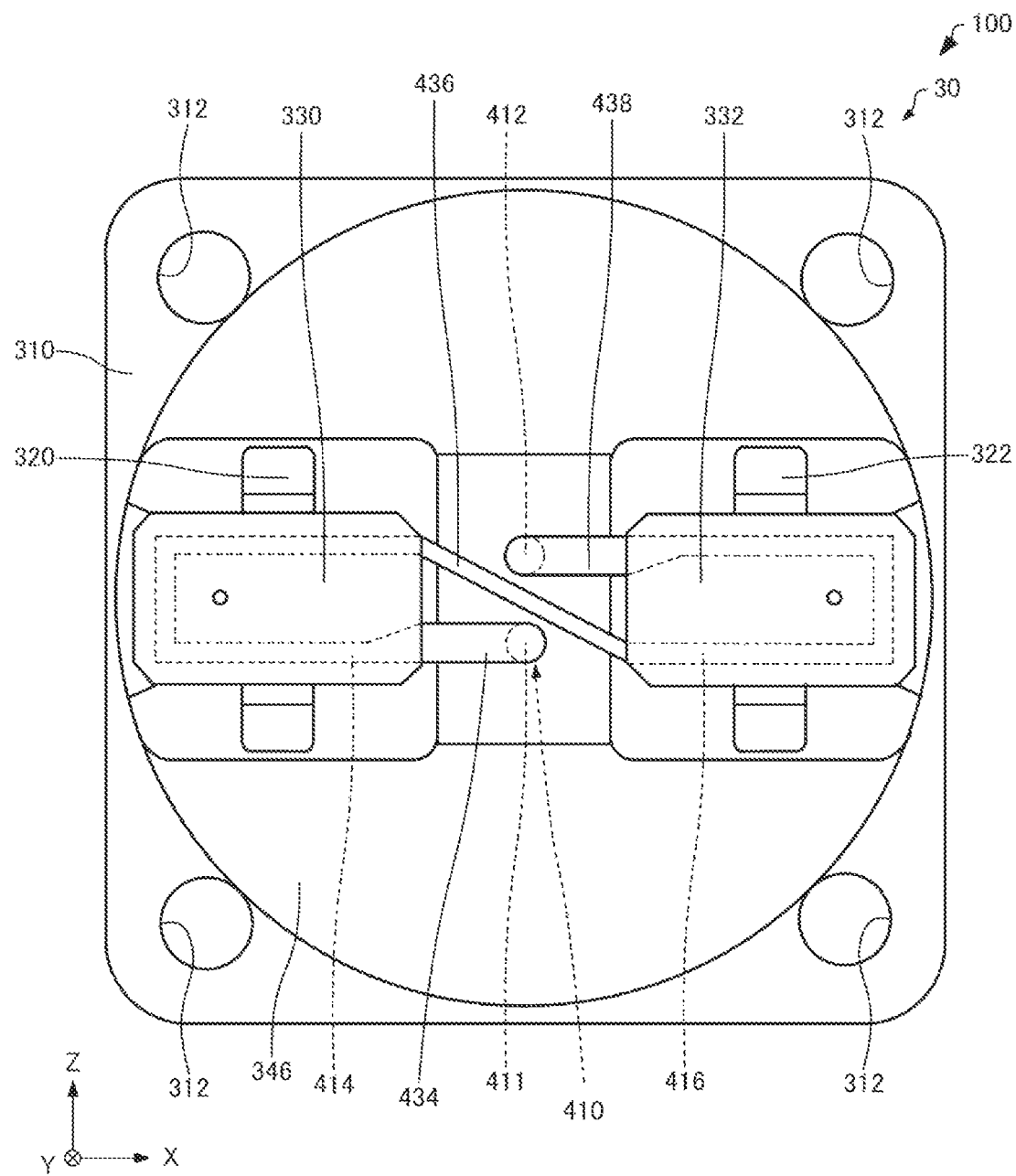
FIG. 12 is a diagram illustrating a first mold flow path and a second mold flow path of the injection molding apparatus according to the present embodiment.

Here, FIG. 12 is a diagram illustrating a first mold flow path 414 formed in the first movable mold 330 and a second mold flow path 416 formed in the second movable mold 332.

As shown in FIG. 12, the first mold flow path 414 is formed along an outer periphery of the first movable mold 330 when viewed from the Y-axis direction. The first mold flow path 414 is coupled to the first axial flow path 411 via a first coupling pipe 434. The second mold flow path 416 is formed along an outer periphery of the second movable mold 332 when viewed from the Y-axis direction. The second mold flow path 416 is coupled to the first mold flow path 414 via a second coupling pipe 436. Further, the second mold flow path 416 is coupled to the second axial flow path 412 via a third coupling pipe 438.

The medium sequentially passes through the rotation shaft member 344, the first movable mold 330, and the second movable mold 332, and then returns to the rotation shaft member 344. In the illustrated example, the medium sequentially passes through the inflow pipe 430, the inflow groove 420, the first axial flow path 411, the first coupling pipe 434, the first mold flow path 414, the second coupling pipe 436, the second mold flow path 416, the third coupling pipe 438, the second axial flow path 412, the outflow groove 422, and the outflow pipe 432. The first axial flow path 411, the first coupling pipe 434, the first mold flow path 414, the second coupling pipe 436, the second mold flow path 416, the third coupling pipe 438, and the second axial flow path 412 constitute the flow path 410. The medium flowing out of the outflow pipe 432 may be cooled by a cooling mechanism not illustrated and then returned to the inflow pipe 430 or may be directly discarded. The medium flows through the first axial flow path 411 and the like described above while the control unit 50 performs the molded product production processing.

Although not illustrated, flow paths through which the medium flows are formed in the first fixed mold 230 and the second fixed mold 232, respectively. The flow path formed in the first fixed mold 230 and the flow path formed in the second fixed mold 232 are coupled to each other. The medium flowing through the movable molds 330 and 332 is discharged without passing through the fixed molds 230 and 232.

1.8. Function and Effect

In the injection molding apparatus 100, the position changing unit 340 includes the driving unit 342, the rotation shaft member 344 configured to rotate by the driving unit 342, and the rotation disk 346 coupled to the rotation shaft member 344 and provided with the first movable mold attachment and detachment unit 320. The rotation disk 346 rotates about the rotation axis Q of the rotation shaft member 344, and the flow path 410 that communicates with the first movable mold 330 and through which the medium flows is formed in the rotation shaft member 344. Therefore, the injection molding apparatus 100 can be simplified as compared with, for example, when a hose through which a medium flows is directly coupled to a movable mold without forming a flow path in a rotation shaft member. For example, when the hose is directly coupled to the movable mold, since the hose rotates with rotation of the rotation shaft member, arrangement of the hose becomes complicated and the apparatus becomes complicated. In addition, water leakage may occur.

In the injection molding apparatus 100, the inflow groove 420 and the outflow groove 422 are formed in the side surface 402 of the rotation shaft member 344, the inflow groove 420 is coupled to the medium inflow port 411a of the flow path 410 and encircles the side surface 402, and the outflow groove 422 is coupled to the medium outflow port 412a of the flow path 410 and encircles the side surface 402. The inflow groove 420 and the outflow groove 422 are separated from each other. Therefore, in the injection molding apparatus 100, the medium can flow into the flow path 410 without rotating, with the rotation of the rotation shaft member 344, the inflow pipe 430 through which the medium flows into the inflow groove 420. Further, in the injection molding apparatus 100, the medium can flow out of the outflow groove 422 without rotating, with the rotation of the rotation shaft member 344, the outflow pipe 432 through which the medium flows out of the outflow groove 422. Accordingly, the apparatus can be simplified.

The injection molding apparatus 100 includes the mold clamping unit 40 that advances and retracts the rotation shaft member 344 in the injection direction, and the mold clamping unit 40 moves the driving unit 342 in conjunction with the rotation shaft member 344. Therefore, in the injection molding apparatus 100, a mechanism that transmits the torque generated by the driving unit 342 to the rotation shaft member 344 can be simplified as compared with when a mold clamping unit does not move a driving unit in conjunction with the rotation shaft member.

The injection molding apparatus 100 includes the eject mechanism 348 provided at the position that faces the second fixed mold 232, and the eject mechanism is not provided at the position facing the first fixed mold 230. Therefore, the injection molding apparatus 100 can be simplified as compared with when the eject mechanism is provided at the position facing the first fixed mold 230.

Although not illustrated, the eject mechanism 348 may be provided at two positions, namely the position facing the first fixed mold 230 and the position facing the second fixed mold 232. In the example described above, an example in which the eject mechanism 348 is driven in conjunction with movement of the movable molds 330 and 332 in the +Y-axis direction has been described, but the eject mechanism 348 may be driven without being in conjunction with the movement of the movable molds 330 and 332.

The injection molding apparatus 100 includes the second movable mold attachment and detachment unit 322 capable of attaching and detaching the second movable mold 332 that is configured to be clamped with the first fixed mold 230 or the second fixed mold 232. The position changing unit 340 locates the second movable mold 332 at the position facing the second fixed mold 232 when the first movable mold 330 is located at the position facing the first fixed mold 230, or locates the second movable mold 332 at the position facing the first fixed mold 230 when the first movable mold 330 is located at the position facing the second fixed mold 232. Therefore, in the injection molding apparatus 100, when the second molding material is injected from the second injection unit 12 toward the first movable mold 330 through the second gate opening 232b of the second fixed mold 232, the first molding material can be injected from the first injection unit 10 toward the second movable mold 332 through the first gate opening 230b of the first fixed mold 230. Accordingly, it is possible to improve production capacity for producing the molded product made of the first molding material and the second molding material.

In the injection molding apparatus 100, the medium sequentially passes through the rotation shaft member 344, the first movable mold 330, and the second movable mold 332, and then returns to the rotation shaft member 344. Therefore, in the injection molding apparatus 100, the two movable molds 330 and 332 can be cooled by one continuous flow path.

1.9. Supplied Material

Examples of the material supplied from the material supply unit 110 include materials containing, as main materials, various materials such as a thermoplastic material, a metal material, and a ceramic material. Here, the "main material" means a core material forming a shape of a molded product, and means a material having a content of 50% by mass or more in the molded product. The materials described above include those in which the main materials are melted alone, and those in which the main materials and some components contained are melted to form a paste.

As the thermoplastic material, for example, a thermoplastic resin can be used. Examples of the thermoplastic resin include: general-purpose engineering plastics such as an acrylonitrile-butadiene-styrene (ABS) resin, polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate; and engineering plastics such as polysulfone, polyether sulfone, polyphenylene sulfide, polyarylate, polyimide, polyamideimide, polyetherimide, and polyether ether ketone (PEEK).

In addition to a pigment, a metal, and a ceramic, an additive such as a wax, a flame retardant, an antioxidant, or a heat stabilizer may be mixed into the thermoplastic material. In the plasticizing unit 120, the thermoplastic material is plasticized by rotation of the flat screw 130 and heating using the heating unit 150, and is converted into a melted state. Further, the first molding material and the second molding material thus produced are injected from the nozzle 168 and then cured due to a decrease in temperature. The thermoplastic material may be injected from the nozzle 168 in a state of being completely melted by being heated to a temperature equal to or higher than a glass transition point thereof.

In the plasticizing unit 120, for example, the metal material may be used as the main material instead of the thermoplastic material described above. In this case, a component to be melted when producing the first molding material and the second molding material may be mixed with a powder material obtained by powdering the metal material, and then fed into the plasticizing unit 120.

Examples of the metal material include single metals such as magnesium (Mg), iron (Fe), cobalt (Co), chromium (Cr), aluminum (Al), titanium (Ti), copper (Cu), and nickel (Ni) or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticizing unit 120, the ceramic material can be used as the main material instead of the metal material described above. Examples of the ceramic material include oxide ceramics such as silicon dioxide, titanium dioxide, aluminum oxide, and zirconium oxide, non-oxide ceramics such as aluminum nitride, and the like.

A powder material of the metal material or the ceramic material supplied from the material supply unit 110 may be a mixed material in which a plurality of types of powder of the single metal or powder of the alloy are mixed or a plurality of types of powder of the ceramic material are mixed. Further, the powder material of the metal material or the ceramic material may be coated with, for example, the thermoplastic resin described above or a thermoplastic resin other than the thermoplastic resin. In this case, the thermoplastic resin may be melted to exhibit fluidity in the plasticizing unit 120.

For example, a solvent may be added to the powder material of the metal material or the ceramic material supplied from the material supply unit 110. Examples of the solvent include, for example, water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, y-picoline, and 2,6-lutidine; tetraalkylammonium acetate (for example, tetrabutylammonium acetate); and ionic liquids such as butyl carbitol acetate.

In addition, for example, a binder may be added to the powder material of the metal material or the ceramic material supplied from the material supply unit 110. Examples of the binder include acrylic resins, epoxy resins, silicone resins, cellulose-based resins, other synthetic resins, PLA, PA, PPS, PEEK, and other thermoplastic resins.

2. Modification of Injection Molding Apparatus

Figure 13:
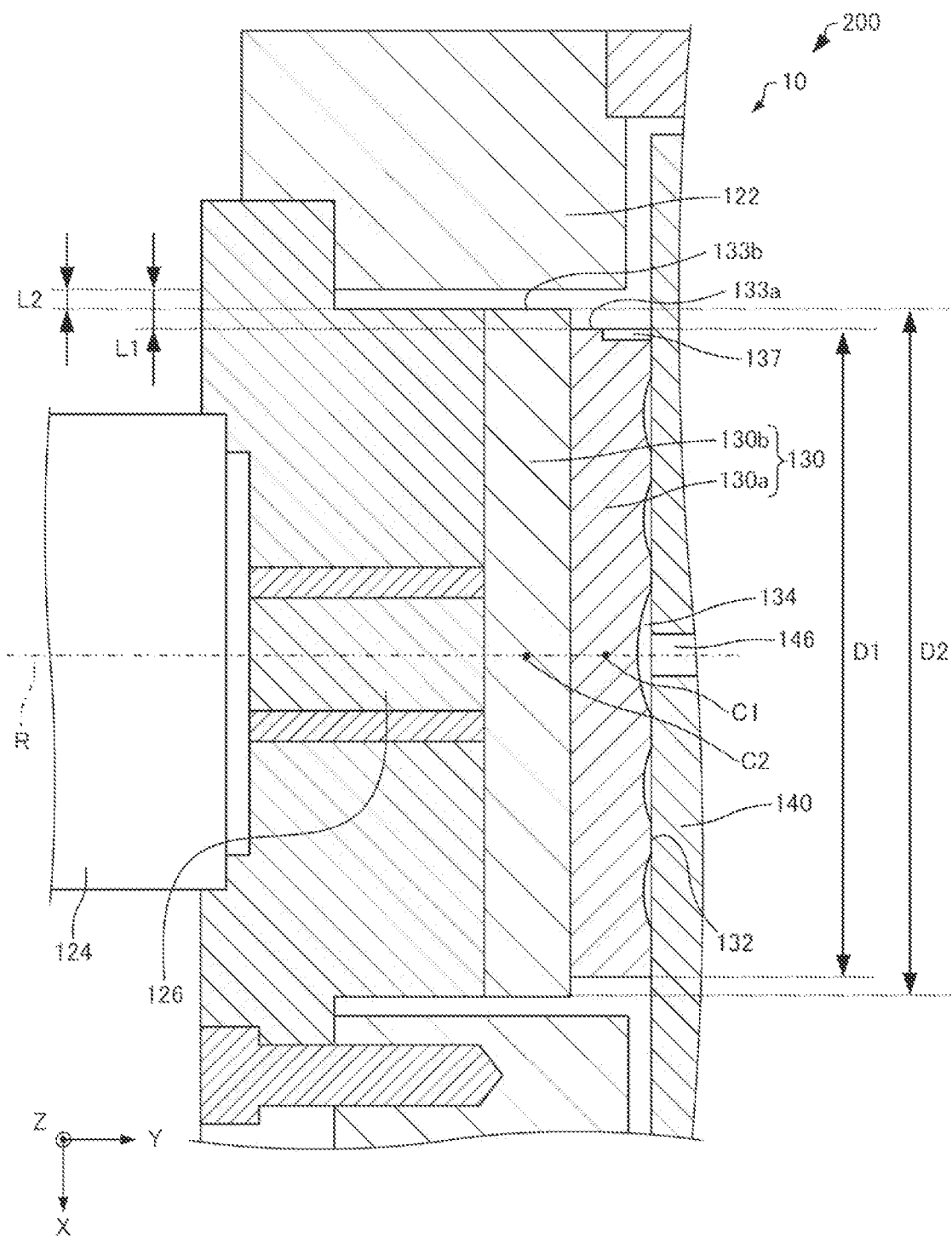
FIG. 13 is a cross-sectional view schematically showing a first injection unit of an injection molding apparatus according to a modification of the present embodiment.

Next, an injection molding apparatus according to a modification of the present embodiment will be described with reference to a drawing. FIG. 13 is a cross-sectional view schematically showing an injection molding apparatus 200 according to the modification of the present embodiment. Hereinafter, in the injection molding apparatus 200 according to the first modification of the present embodiment, members having the same functions as those of constituent members of the injection molding apparatus 100 according to the present embodiment described above are denoted by the same reference numerals, and detailed description thereof will be omitted.

As shown in FIG. 13, the injection molding apparatus 200 is different from the injection molding apparatus 100 described above in that the flat screw 130 includes a first side surface 133a and a second side surface 133b.

For example, the flat screw 130 includes a first portion 130a and a second portion 130b. The first portion 130a is provided on a barrel 140 side of the second portion 130b. The first portion 130a is provided between the barrel 140 and the second portion 130b. A shape of the first portion 130a is, for example, a circular shape when viewed from the Y-axis direction. A center C1 of the first portion 130a is located on the rotation axis R when viewed from the Y-axis direction. The first portion 130a includes the groove-formed surface 132 and the first side surface 133a intersecting with the groove-formed surface 132. In an illustrated example, the first side surface 133a is orthogonal to the groove-formed surface 132. The material introduction port 137 of the first groove 134 is formed in the first side surface 133a.

The second portion 130b is provided on a side of the first portion 130a opposite to the barrel 140. In the illustrated example, the second portion 130b is located in the −Y-axis direction with respect to the first portion 130a. The shaft 126 is coupled to the second portion 130b. The second portion 130b is coupled to the first portion 130a. A shape of the second portion 130b is, for example, a circular shape when viewed from the Y-axis direction. A center C2 of the second portion 130b is located on the rotation axis R when viewed from the Y-axis direction.

The second portion 130b includes the second side surface 133b. The second side surface 133b is farther from the barrel 140 than the first side surface 133a. A distance between the second side surface 133b and the barrel 140 is larger than a distance between the first side surface 133a and the barrel 140.

A diameter D2 of the second portion 130b is larger than a diameter D1 of the first portion 130a when viewed from the Y-axis direction. A distance L2 between the second side surface 133b and the screw case 122 is smaller than a distance L1 between the first side surface 133a and the screw case 122. The distance L1 is the shortest distance between the first side surface 133a and the screw case 122. The distance L2 is the shortest distance between the second side surface 133b and the screw case 122.

The first molding material injected from the first injection unit 10 is an elastomer resin. Examples of the elastomer resin include a urethane resin, a silicone resin, and the like. The second molding material injected from the second injection unit 12 is a resin that is not an elastomer resin. The second molding material is, for example, an ABS resin or the like.

When the first molding material is the elastomer resin and the second molding material is a resin that is not the elastomer resin, the distance L2 between the second side surface 133b and the screw case 122 in the first injection unit 10 is smaller than the distance L2 between the second side surface 133b and the screw case 122 in the second injection unit 12.

The elastomer resin is a resin that has high elasticity and stretchability and is light, as compared with the ABS resin or the like that is not the elastomer resin. Therefore, when the elastomer resin enters between a flat screw and a screw case, it is difficult to remove the elastomer resin entering between the flat screw and the screw case, and furthermore, the elastomer resin may reach a shaft and stop rotation of the flat screw.

In order to address the above problem, in the injection molding apparatus 200, the distance L2 between the second side surface 133b and the screw case 122 in the first injection unit 10 which handles the elastomer resin is made smaller than the distance L2 between the second side surface 133b and the screw case 122 in the second injection unit 12 which does not handle the elastomer resin. Accordingly, it is possible to reduce a possibility that the elastomer resin enters between the second portion 130b and the screw case 122.

In the injection molding apparatus 200, the injection units 10 and 12 may be attached and detached depending on the supplied material. The first injection unit 10 may inject a thermosetting resin, and the second injection unit 12 may inject a thermoplastic resin.

The embodiment and the modification described above are merely examples, and the present disclosure is not limited thereto. For example, the embodiment and the modification can be combined as appropriate.

The present disclosure includes a configuration substantially the same as a configuration described in the embodiment, for example, a configuration having the same function, method, and result, or a configuration having the same object and effect. The present disclosure includes a configuration in which a non-essential portion of the configuration described in the embodiment is replaced. The present disclosure includes a configuration having the same function and effect as the configuration described in the embodiment, or a configuration capable of achieving the same object. The present disclosure includes a configuration in which a known technique is added to the configuration described in the embodiment.

The following contents are derived from the embodiment described above.

An injection molding apparatus according to an aspect includes: a first fixed mold attachment and detachment unit configured to attach and detach a first fixed mold; a second fixed mold attachment and detachment unit configured to attach and detach a second fixed mold; a first movable mold attachment and detachment unit configured to attach and detach a first movable mold that is configured to be clamped with the first fixed mold or the second fixed mold; a first injection unit configured to inject a first molding material through a first gate opening of the first fixed mold; a second injection unit configured to inject a second molding material through a second gate opening of the second fixed mold; and a position changing unit configured to change a position of the first movable mold attachment and detachment unit such that the first movable mold is located at a position facing the first fixed mold or the second fixed mold. The position changing unit includes: a driving unit, a rotation shaft member configured to rotate by the driving unit, and a rotation disk coupled to the rotation shaft member and provided with the first movable mold attachment and detachment unit. The rotation disk is configured to rotate about a rotation axis of the rotation shaft member, and a flow path that communicates with the first movable mold and through which a medium flows is formed in the rotation shaft member.

According to the injection molding apparatus, the apparatus can be simplified.

In the injection molding apparatus according to the aspect, in a side surface of the rotation shaft member, an inflow groove and an outflow groove may be formed, the inflow groove being coupled to a medium inflow port of the flow path and encircling the side surface, the outflow groove being coupled to a medium outflow port of the flow path and encircling the side surface, and the inflow groove and the outflow groove may be separated from each other.

According to the injection molding apparatus, the medium can flow into the flow path without rotating, with the rotation of the rotation shaft member, the inflow pipe through which the medium flows into the inflow groove. Further, the medium can flow out of the outflow groove without rotating, with the rotation of the rotation shaft member, the outflow pipe through which the medium flows out of the outflow groove.

The injection molding apparatus according to the aspect may further include a mold clamping unit configured to advance and retract the rotation shaft member in an injection direction, and the mold clamping unit may move the driving unit in conjunction with the rotation shaft member.

According to the injection molding apparatus, it is possible to simplify the mechanism that transmits the torque generated by the driving unit to the rotation shaft member.

The injection molding apparatus according to the aspect may further include an eject mechanism provided at a position facing the second fixed mold, and an eject mechanism may not be provided at a position facing the first fixed mold.

According to the injection molding apparatus, the apparatus can be simplified.

The injection molding apparatus according to the aspect may further include a second movable mold attachment and detachment unit configured to attach and detach a second movable mold that is configured to be clamped with the first fixed mold or the second fixed mold, and the position changing unit may locate the second movable mold at a position facing the second fixed mold when the first movable mold is located at a position facing the first fixed mold, and locate the second movable mold at a position facing the first fixed mold when the first movable mold is located at a position facing the second fixed mold.

According to the injection molding apparatus, it is possible to improve the production capacity for producing the molded product made of the first molding material and the second molding material.

In the injection molding apparatus according to the aspect, the medium may sequentially pass through the rotation shaft member, the first movable mold, and the second movable mold, and then return to the rotation shaft member.

According to the injection molding apparatus, the two movable molds can be cooled by one continuous flow path.

In the injection molding apparatus according to the aspect, the first injection unit and the second injection unit may each include a plasticizing unit configured to plasticize a supplied material, and the plasticizing unit may include a flat screw having a groove-formed surface in which a groove is formed, a barrel having a facing surface that faces the groove-formed surface and formed with a communication hole, and a case in which the flat screw is housed. The flat screw may include a first side surface intersecting with the groove-formed surface and formed with an introduction port through which the material is introduced, and a second side surface farther from the barrel than the first side surface. A distance between the second side surface and the case may be smaller than a distance between the first side surface and the case.

According to the injection molding apparatus, it is possible to reduce the possibility that the first molding material enters between the second side surface and the case.

In the injection molding apparatus according to the aspect, the first molding material may be an elastomer resin, the second molding material may be a resin that is not an elastomer resin, and the distance between the second side surface and the case in the first injection unit may be smaller than the distance between the second side surface and the case in the second injection unit.

According to the injection molding apparatus, it is possible to reduce the possibility that the first molding material, which is the elastomer resin, enters between the second side surface and the case.

What is claimed is:

1. An injection molding apparatus, comprising:
   a first fixed mold attachment and detachment unit configured to attach and detach a first fixed mold;
   a second fixed mold attachment and detachment unit configured to attach and detach a second fixed mold;
   a first movable mold attachment and detachment unit configured to attach and detach a first movable mold that is configured to be clamped with the first fixed mold or the second fixed mold;
   a first injection unit configured to inject a first molding material through a first gate opening of the first fixed mold;
   a second injection unit configured to inject a second molding material through a second gate opening of the second fixed mold; and
   a position changing unit configured to change a position of the first movable mold attachment and detachment unit such that the first movable mold is located at a position facing the first fixed mold or the second fixed mold, wherein
   the position changing unit includes:
      a driving unit,
      a rotation shaft member configured to rotate by the driving unit, and
      a rotation disk coupled to the rotation shaft member and provided with the first movable mold attachment and detachment unit,
   the rotation disk is configured to rotate about a rotation axis of the rotation shaft member, and
   a flow path that communicates with the first movable mold and through which a medium flows is formed in the rotation shaft member.

2. The injection molding apparatus according to claim 1, wherein
   in a side surface of the rotation shaft member, an inflow groove and an outflow groove are formed, the inflow groove being coupled to a medium inflow port of the flow path and encircling the side surface, the outflow groove being coupled to a medium outflow port of the flow path and encircling the side surface, and
   the inflow groove and the outflow groove are separated from each other.

3. The injection molding apparatus according to claim 1, further comprising:
   a mold clamping unit configured to advance and retract the rotation shaft member in an injection direction, wherein
   the mold clamping unit is configured to move the driving unit in conjunction with the rotation shaft member.

4. The injection molding apparatus according to claim 1, further comprising:
   an eject mechanism provided at a position facing the second fixed mold, wherein
   an eject mechanism is not provided at a position facing the first fixed mold.

5. The injection molding apparatus according to claim 1, further comprising:
   a second movable mold attachment and detachment unit configured to attach and detach a second movable mold that is configured to be clamped with the first fixed mold or the second fixed mold, wherein
   the position changing unit is configured to:
      locate the second movable mold at a position facing the second fixed mold when the first movable mold is located at a position facing the first fixed mold, and
      locate the second movable mold at a position facing the first fixed mold when the first movable mold is located at a position facing the second fixed mold.

6. The injection molding apparatus according to claim 5, wherein
   the medium sequentially passes through the rotation shaft member, the first movable mold, and the second movable mold, and then returns to the rotation shaft member.

7. The injection molding apparatus according to claim 1, wherein
   the first injection unit and the second injection unit each include a plasticizing unit configured to plasticize a supplied material,
   the plasticizing unit includes:
      a flat screw having a groove-formed surface in which a groove is formed,
      a barrel having a facing surface that faces the groove-formed surface and formed with a communication hole, and
      a case in which the flat screw is housed,
   the flat screw includes:
      a first side surface intersecting with the groove-formed surface and formed with an introduction port through which the material is introduced, and
      a second side surface farther from the barrel than the first side surface, and
   a distance between the second side surface and the case is smaller than a distance between the first side surface and the case.

8. The injection molding apparatus according to claim 7, wherein
   the first molding material is an elastomer resin,
   the second molding material is a resin that is not an elastomer resin, and
   the distance between the second side surface and the case in the first injection unit is smaller than the distance between the second side surface and the case in the second injection unit.

* * * * *